US012784521B2

(12) United States Patent
Man et al.

(10) Patent No.: US 12,784,521 B2
(45) Date of Patent: Nov. 3, 2026

(54) VEHICLE KEY SEARCH SYSTEM AND METHOD

(71) Applicant: HYUNDAI MOTOR COMPANY, Seoul (KR)

(72) Inventors: Jian Kang Man, Shandong (CN); Yi Ping Sui, Shandong (CN); Lei Gong, Shandong (CN)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/975,921

(22) Filed: Dec. 10, 2024

(65) Prior Publication Data

US 2026/0162476 A1 Jun. 11, 2026

(30) Foreign Application Priority Data

Dec. 9, 2024 (CN) ......................... 202411796077.4

(51) Int. Cl.
*G07C 9/00* (2020.01)
*G08B 21/24* (2006.01)

(52) U.S. Cl.
CPC ......... *G07C 9/00309* (2013.01); *G08B 21/24* (2013.01); *G07C 2209/63* (2013.01)

(58) Field of Classification Search
CPC .................................................. G07C 9/00309
See application file for complete search history.

(56) References Cited

U.S. PATENT DOCUMENTS

| | | | | |
|---|---|---|---|---|
| 2010/0019925 | A1* | 1/2010 | Biondo | B60R 25/00 340/8.1 |
| 2011/0234399 | A1* | 9/2011 | Yan | H04W 76/11 340/539.32 |
| 2015/0116079 | A1* | 4/2015 | Mishra | G07C 9/257 340/5.52 |
| 2016/0320469 | A1* | 11/2016 | Laifenfeld | H04W 4/021 |
| 2016/0335877 | A1* | 11/2016 | Steven | G08B 21/24 |
| 2017/0249791 | A1* | 8/2017 | Woo | G07C 9/28 |
| 2018/0096584 | A1* | 4/2018 | Choi | H04B 1/3833 |
| 2020/0020331 | A1* | 1/2020 | Kim | G10L 15/30 |

* cited by examiner

*Primary Examiner* — Davetta W Goins
*Assistant Examiner* — Pameshanand Mahase
(74) *Attorney, Agent, or Firm* — Morgan, Lewis & Bockius LLP

(57) ABSTRACT

A vehicle key search system includes a vehicle with a processor configured to generate a vehicle key search command in response to user input and a communication device that transmits a vehicle key search signal based on the command. A vehicle key, upon receiving the vehicle key search signal, transmits a corresponding response signal to the communication device and externally emits at least one of a visual or auditory signal.

15 Claims, 12 Drawing Sheets

VEHICLE KEY SEARCH SYSTEM AND METHOD

TECHNICAL FIELD

Embodiments relate to a vehicle key search system and method.

BACKGROUND

Frequent situations arise where a vehicle's smart key, digital key, or mobile phone is left in a location that is difficult to identify, such as inside a vehicle, office, or home, rendering it hard to locate. Recently, with the rapid increase in the use of smart keys or digital keys, when a vehicle key is not found, there may be a problem that a driver cannot use a vehicle or enter the vehicle in an emergency situation due to locked vehicle doors.

Furthermore, losing a vehicle key can result in vehicle theft or a potential breach of personal information stored on a mobile phone.

SUMMARY

The present invention is directed to providing a vehicle key search system and method, which are capable of confirming a position of a smart key or a digital key.

This reduces unnecessary time spent searching for a vehicle key. It also mitigates the risk of vehicle theft. In addition, it is possible to save the cost and time required to obtain a replacement key.

In addition, it is possible to prevent the leakage of personal information through a mobile phone.

According to an embodiment, there is provided a vehicle key search system including a vehicle including a processor configured to output a vehicle key search command in response to a user input, and a communication device configured to output a vehicle key search signal in response to the vehicle key search command, and a vehicle key that transmits a response signal corresponding to the vehicle key search signal back to the communication device when receiving the vehicle key search signal and externally outputs at least one of a visual signal and an auditory signal.

The communication device may transmit the key search signal using a low-frequency (LF) antenna. The communication device may sequentially output the key search signal under the control of the processor using a plurality of LF antennas.

The communication device may stop outputting the key search signal when receiving the response signal.

The processor may display the area where the vehicle key search signal corresponding to the response signal is transmitted, via an internal or external vehicle output device. The key search signal may have a different data frame from a signal used when a passive-entry-passive-start (PEPS) function is performed.

The communication device may transmit the key search signal using a Bluetooth communication module.

The processor may measure a position of the vehicle key using the response signal.

The processor may display the position of the vehicle key measured through the vehicle internal/external output device.

The processor may display a message via an internal or external vehicle output device if the response signal is not received within a preset time after transmitting the key search signal. According to an embodiment, there is provided a vehicle key search system including a first vehicle key that outputs a vehicle key search signal in response to a user input, and a second vehicle key that transmits a response signal corresponding to the vehicle key search signal back to the first vehicle key when receiving the vehicle key search signal and externally outputs at least one of a visual signal and an auditory signal.

The first vehicle key may be a smart key or a digital key, while the second vehicle key may be a different type of key from the first, selected between the smart key and the digital key. According to an embodiment, there is provided a vehicle key search method including outputting, by a vehicle, a vehicle key search command in response to a user input, outputting, by the vehicle, a vehicle key search signal in response to the vehicle key search command, receiving, by a vehicle key, the vehicle key search signal, transmitting, by the vehicle key, a response signal corresponding to the vehicle key search signal, and externally outputting, by the vehicle key, at least one of a visual signal and an auditory signal.

The transmission of the key search signal may include sequentially transmitting the signal using multiple low-frequency (LF) antennas. The vehicle key search method may further include stopping outputting the key search signal when receiving the response signal.

The vehicle key search method may further include displaying an area in which the vehicle key search signal corresponding to the response signal is output through a vehicle internal/external output device when receiving the response signal.

The outputting of the key search signal may include outputting the key search signal using a Bluetooth communication module.

The vehicle key search method may further include determining the position of the vehicle key using the response signal upon its receipt. The vehicle key search method may further include displaying the position of the vehicle key measured through a vehicle internal/external output device.

The vehicle key search method may further include outputting, by the vehicle, a message through the vehicle internal/external output device when not receiving the response signal within a preset time after outputting the key search signal.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Figure 1:
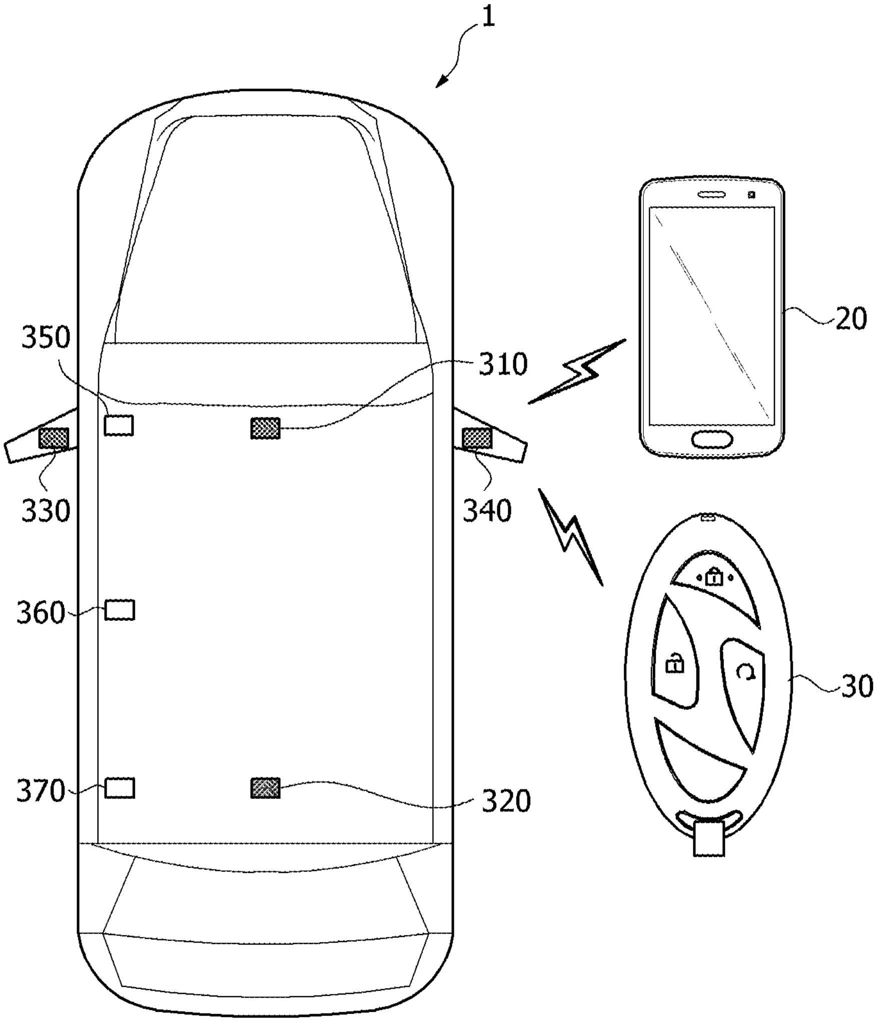
FIG. 1 is a view illustrating a vehicle according to an embodiment.

Hereinafter, exemplary embodiments of the present invention will be described in detail with reference to the accompanying drawings.

However, the technical spirit of the present invention is not limited to some of the described embodiments, but may be implemented in various different forms. Additionally, one or more components from the embodiments may be selectively combined or substituted without departing from the invention's technical scope.

In addition, terms (including technical and scientific terms) used in embodiments of the present invention may be construed as meaning that may be generally understood by those skilled in the art to which the present invention pertains unless explicitly specifically defined and described, and the meanings of the commonly used terms, such as terms defined in a dictionary, may be construed in consideration of contextual meanings of related technologies.

Furthermore, the terms used in the embodiments are provided for descriptive purposes only and are not intended to limit the scope of the present invention. In the specification, a singular form may include a plural form unless otherwise specified in the phrase, and when described as "at least one (or one or more) of A, B, and C," one or more among all possible combinations of A, B, and C may be included.

In addition, terms such as first, second, A, B, (a), and (b) may be used to describe components of the embodiments of the present invention.

These terms solely intended to distinguish one component from another component, and the nature, sequence, order, or the like of the corresponding components is not limited by these terms.

In addition, when a first component is described as being "connected," "coupled," or "joined" to a second component, it may include a case in which the first component is directly connected, coupled, or joined to the second component, but also a case in which the first component is "connected," "coupled," or "joined" to the second component by other components present between the first component and the second component.

In addition, when the first component is described as being formed or disposed on "on (above) or below (under)" the second component, "on (above)" or "below (under)" may include not only a case in which two components are in direct contact with each other, but also a case in which one or more third components are formed or disposed between the two components. In addition, when described as "on (above) or below (under)," it may include the meaning of not only an upward direction but also a downward direction based on one component.

Hereinafter, embodiments will be described in detail with reference to the accompanying drawings. Identical or corresponding components are denoted by the same reference numerals, and repetitive descriptions are omitted for clarity. For purposes of this application and the claims, using the exemplary phrase "at least one of: A; B; or C" or "at least one of A, B, or C," the phrase means "at least one A, or at least one B, or at least one C, or any combination of at least one A, at least one B, and at least one C. Further, exemplary phrases, such as "A, B, and C", "A, B, or C", "at least one of A, B, and C", "at least one of A, B, or C", etc. as used herein may mean each listed item or all possible combinations of the listed items. For example, "at least one of A or B" may refer to (1) at least one A; (2) at least one B; or (3) at least one A and at least one B.

Throughout the present disclosure, references to components, units, or modules generally refer to items that logically can be grouped together to perform a function or group of related functions. Like reference numerals are generally intended to refer to the same or similar components. Components, units, and modules may be implemented in software, hardware or a combination of software and hardware. The components, units, modules, and/or functions described above may be implemented and/or performed by one or more processors. For example, the components, units, and/or modules may include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The components, units, and/or modules may also include software control module(s) implemented with a processor or logic circuitry for example. The components, units, and/or modules may include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware. One or more types of storage media may include any or all of the tangible memory of computers, processors, or the like, or associated modules thereof, such as various semiconductor memories, tape drives, disk drives and the like, which may provide non-transitory storage at any time for software programming.

Figure 2:
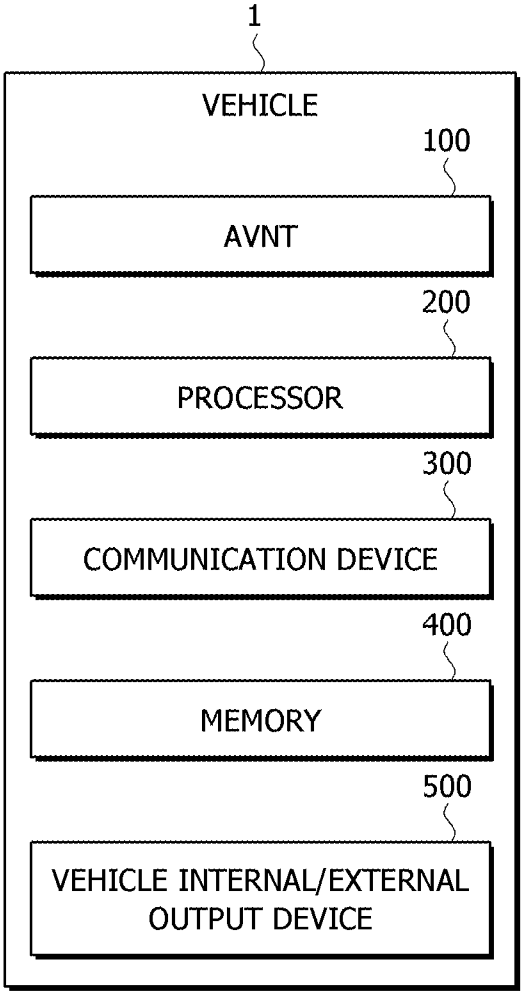
FIG. 2 is a block diagram illustrating a configuration of the vehicle according to the embodiment.

FIG. 1 illustrates a vehicle according to an embodiment, and FIG. 2 is a block diagram illustrating a configuration of the vehicle according to the embodiment. Referring to FIGS. 1 and 2, a vehicle 1 according to the embodiment may include an audio video navigation and telematics (AVNT) 100, a processor 200, a communication device 300, a memory 400, and a vehicle internal/external output device 500.

The vehicle 1 may include the AVNT 100, located in a center fascia, which controls devices such as an audio system, air conditioner, Bluetooth device, and seat heater. An input device for receiving a user input may be disposed in the center fascia or the AVNT 100, and a display device for displaying operation information for at least one of functions performed in the vehicle 1 may also be disposed.

The input device may include hardware devices such as various buttons or switches, pedals, a keyboard, a mouse, a track-ball, various levers, a handle, or a stick.

In addition, the input device may include a graphical user interface (GUI), that is, a software device, such as a touch pad. The touch pad may be implemented as a touch screen panel (TSP) to form a mutual layer structure with a display panel of the display device.

The display device may function as a user interface. The display device may display the vehicle's operating state, control state, route/traffic information, energy remaining information, content requested by a driver, and the like by a processor. Furthermore, the display device may function as a touchscreen capable of detecting driver input to process the driver's requests.

The interior of a vehicle body may include a keyway into which a fob type or card type remote controller may be inserted. Here, the keyway may be provided on a dashboard or center fascia and provided at a position adjacent to a driver's seat.

The vehicle 1 may transmit and receive information with a remote controller or a terminal when the remote controller is inserted into the keyway or when authentication with the remote controller or terminal is completed via a wireless communication network.

The interior of the vehicle body may further include a start button that receives on/off commands. Therefore, the vehicle starts when the start button is pressed by the user after the authentication with the remote controller or terminal is completed.

The vehicle 1 may also include a communication device for transmitting and receiving information with at least one of electronic devices and a terminal 20 that are provided in the vehicle.

The communication device 300 may include one or more components that enable communication between in-vehicle components and for example, may include at least one of a short-range communication module, a wired communication module, and a wireless communication module.

Additionally, the communication device 300 may include at least one of the wired communication module and the wireless communication module for communicating with the user terminal 20 and a server.

For example, the short-range communication module may support transmitting and receiving signals via a wireless communication network over short distances. Examples include a Bluetooth module, an infrared communication module, a radio frequency (RF) identification module, a wireless local area network (WLAN) module, a near-field communication (NFC) module, or a Zigbee module. For example, the wired communication module may include not only various wired communication modules such as a controller area network (CAN) communication module, a local area network (LAN) module, a wide area network (WAN) module, and a value added network (VAN) module, but also various cable communication modules such as a universal serial bus (USB), a high definition multimedia interface (HDMI), a digital visual interface (DVI), a recommended standard 232 (RS-232), power line communication, and plain old telephone service (POTS).

For example, a controller area network (CAN) is a communication protocol designed for real-time data exchange between microcontrollers and devices within vehicles and industrial systems. CAN may allow multiple electronic control units to communicate with each other without the need for a host computer, making it useful for applications where reliable, high-speed communication is critical.

For example, a value added network (VAN) may comprise a private network that may provide businesses with secure, reliable communication channels for exchanging data and documents. VANs may offer services (e.g., data encryption, format translation, message routing, or tracking, etc.) to ensure that business documents (e.g., invoices, purchase orders, or shipping notices, etc.) may be transmitted efficiently and/or securely between trading partners.

The wired communication module may further include a local interconnect network (LIN). For example, a local interconnect network (LIN) may comprise a low-cost serial communication protocol that may be used in automotive systems to connect electronic components (e.g., sensors, actuators, or control units, etc.). For example, for simplicity and/or cost-efficiency, LIN may manage functions that do not require high-speed data transfer (e.g., window controls, seat adjustments, lighting, or climate control, etc.). LIN may function on a single-master, multiple-slave architecture, where one master node may coordinate communication with multiple slave nodes.

In addition, in addition to the Wi-Fi module and the wireless broadband (WiBro) module, the wireless communication module may include a wireless communication module for supporting various wireless communication methods, such as global system for mobile communication (GSM), code division multiple access (CDMA), wideband code division multiple access (WCDMA), universal mobile telecommunications system (UMTS), time division multiple access (TDMA), and long term evolution (LTE).

The user terminal 20 communicates with the vehicle 1, receiving commands such as a vehicle door lock/unlock command, a tailgate lock/unlock command, a start command, or a lamp lighting command as user input, and transmitting corresponding information to the vehicle. The user terminal 20 may transmit the information corresponding to the received command to the vehicle as a communication signal.

The user terminal 20 may be implemented as a computer or portable terminal that can be communicatively connected to the vehicle via a network.

Here, the computer may include, for example, a notebook, desktop, laptop, tablet PC, slate PC, or the like that is provided with a WEB browser, and the portable terminal is a wireless communication device that ensures portability and mobility and may include, for example, any kind of handheld-based wireless communication device such as a personal communication system (PCS), a GSM, a personal digital cellular (PDC), a personal handyphone system (PHS), a personal digital assistant (PDA), an international mobile telecommunication (IMT)-2000, CDMA-2000, WCDMA, and wireless broadband Internet (WiBro) terminals, and a smartphone, and wearable devices such as a watch, a ring, a bracelet, an anklet, a necklace, glasses, contact lenses, or a head-mounted-device (HMD).

In an embodiment, the user terminal 20 communicates with the vehicle through a Bluetooth low energy (BLE) communication method. The user terminal 20 may perform communication based on the Bluetooth beacon standard (iBeacon).

The AVNT 100 is the term refers to an in-vehicle information and entertainment system and may be a system that integrates navigation, audio, video, and communication functions. The AVNT 100 may output a message generated by the processor 200 in at least one of a visual manner, an audible manner, or a combination thereof.

The AVNT 100, the processor 200, and the communication device 300 may be implemented as one module, but in the embodiment, will be described separately for convenience of description.

The AVNT 100 may be a component for providing a hardware interface integrated into the system in the vehicle. The AVNT 100 may perform system control for a screen, buttons, and various integrated information and entertainment functions.

The AVNT 100 may be installed at the center or console of the vehicle dashboard to provide vehicle information and an entertainment interface. The information and entertainment system may include AM/FM radio, satellite radio, DVDs/CDs, cassette tapes, USB MP3, dashcams, GPS navigation devices, Bluetooth, Wi-Fi, and the like and also provide the state information of the vehicle system. In addition, the AVNT 100 may perform functions such as voice control and motion recognition.

The processor 200 may control the vehicle body such as a vehicle, doors, windows, or keys (a digital key, a smartphone key, and a fob). The processor may perform a body control function (BCM), a smart key entry/start function (SMK), a tire air pressure monitoring function (TPMS), an immobilizer function (IMMO), digital key authentication (IAU), an autonomous parking related control function (PDW), and the like. For example, the processor 200 may function as a body domain controller (BDC), but it is not limited to this and may also serve as a platform controller for delivering electronic convenience functions to the body domain area.

The communication device 300 may perform pairing between the user terminal 20 and the vehicle 1 using a Bluetooth signal.

The communication device 300 may include a transceiver for transmitting and receiving information via an antenna, a communication circuit, a communication processor, and the like and perform short-range communication with the user terminal 20. According to an embodiment, the communication device 300 may perform Bluetooth communication, NFC communication, or UWB communication. The communication device 300 may be provided near a door handle of the vehicle 1 to request authentication information when it is determined that the user terminal approaches within a predetermined distance.

In the Bluetooth standard, Bluetooth 1.0 stipulates that a data transmission rate is 1 Mbps and a transmission distance ranges from 10 to 100 m, and communication is possible even in the presence of obstacles because Bluetooth 1.0 uses a high radio frequency of 2.4 GHz.

The communication device 300 according to the embodiment may measure the position of the user terminal under the control of the processor 200 when the user terminal including a fob or digital key approaches the outside of the vehicle 1, unlock the vehicle door according to the result of positioning, and control the remote start of the vehicle 1 to be performed.

The communication device 300 may include a plurality of positioning modules 310 to 340. The positioning modules 310 to 340 may be short-range wireless communication modules, and each wireless communication module may measure the strength of a wireless signal received from the user terminal. One of the wireless communication modules mounted on the vehicle 1 may function as a master module. The master module collects the wireless signal strength measured by other communication modules and transmits the data to the processor.

For example, the positioning modules 310 to 340 may consist of a Bluetooth module, a low-power Bluetooth module, a Wi-Fi module, and the like. The positioning modules 310 to 340 may include an FRT antenna provided at the front of the vehicle and mounted on the AVNT at the front of the vehicle 1, an RR antenna provided at the rear of the vehicle and mounted on a shark antenna, an LH antenna mounted on a left O/S mirror, and an RH antenna mounted on a right O/S mirror. A wireless signal strength of the user terminal 20 may be independently measured and transmitted to a master module.

In addition, the communication device may include a plurality of low-frequency (LF) antennas 350 to 370. The LF antennas 350 to 370 are each disposed inside in-vehicle areas frequently accessed by a user, such as a driver's seat, a passenger door, and a trunk, and emit low-frequency signals to detect the fob key. LF signals may interact with the fob key within a range of approximately 1 to 2 meters to detect its position. The LF antenna may detect the fob key using a low frequency band of 125 kHz or 134.2 kHz.

The fob key receiving the low frequency signals of the LF antennas 350 to 370 may transmit RF signals to the processor in response to the low frequency signals.

The processor 200 may oversee the overall control of the vehicle 1 and is configured to execute applications and instructions stored in the memory 400. The processor 200 may be a main CPU for overall control of the vehicle 1. In an embodiment, the processor 200 may perform a pairing operation by executing a Bluetooth application to perform communication between the Bluetooth application and the communication device.

The processor 200 may determine a relative position of the user terminal 20 with respect to the vehicle 1. In an embodiment, the relative position may include a distance between the vehicle 1 and the user terminal 20 and a direction in which the user terminal 20 is positioned with respect to the vehicle 1.

For example, the processor 200 may determine the relative position using at least one of the Wi-Fi, Bluetooth, and low-power Bluetooth methods.

The processor 200 may compare the positioning result and the positioning pattern and determine the relative position of the user terminal 20.

For example, the processor 200 may determine the relative position between the vehicle and the user terminal using a received signal strength indicator (RSSI) method that measures the strength of a Wi-Fi signal to estimate a distance.

Alternatively, the processor 200 may determine the relative position between the vehicle and the user terminal using the RSSI method that measures the strength of a Bluetooth signal to estimates a distance.

The memory 400 stores applications and various data for controlling the vehicle 1. It may load applications or read/write data at the request of the processor 200. The memory 400 may store at least one algorithm that performs calculation or execution of various commands for operating the vehicle control system 10 according to the embodiment. The memory 400 may include at least one storage medium of a flash memory, a hard disc, a memory card, a read-only memory (ROM), a random access memory (RAM), an electrically erasable programmable ROM (EEPROM), a programmable ROM (PROM), a magnetic memory, a magnetic disc, and an optical disc.

The following embodiments describe an example where positioning is performed using a Bluetooth signal and a passive-entry-passive-start (PEPS) operation is controlled. The PEPS function may be a function that automatically performs operations such as door lock/unlock and vehicle starting after estimating the position of a smartphone through a communication module mounted on a vehicle. For example, the processor 200 may estimate the relative position of the user terminal 20 with respect to the vehicle using the signal strength of the Bluetooth signal received from the user terminal 20 connected to the Bluetooth module. The processor 200 may provide a passive entry function when the estimated position of the user terminal 20 approaches the vehicle and provide a passive start function when the estimated position of the user terminal 20 is inside the vehicle.

Figure 3:
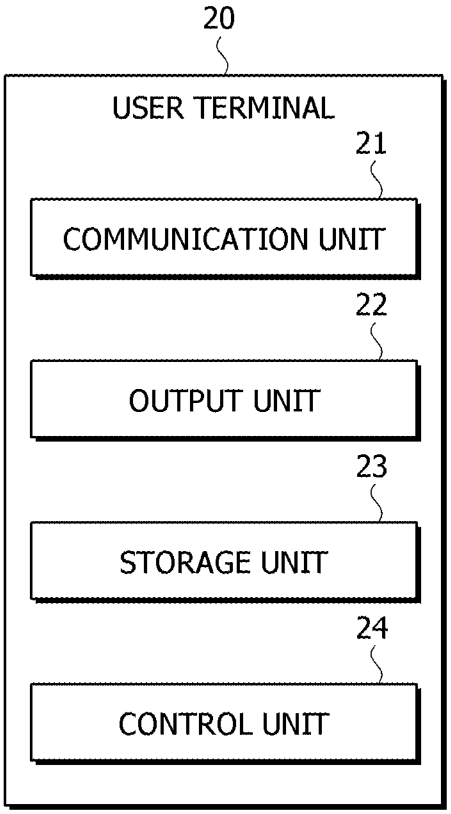
FIG. 3 is a block diagram illustrating a configuration of a user terminal according to the embodiment.

FIG. 3 illustrates a block diagram of the user terminal's configuration in the embodiment. Referring to FIG. 3, the user terminal 20 includes a communication unit 21, an output unit 22, a storage unit 23, and a control unit 24.

The user terminal 20 may include a smartphone, a smart pad, a notebook computer, and the like that the user can carry. The user terminal 20 may store a digital key that generates authentication information for controlling functions such as locking and unlocking of the vehicle door, remote starting, emergency alarm, and trunk opening.

The communication unit 21 may include a transceiver for transmitting and receiving information using an antenna, a communication circuit, a communication processor, and the like and perform short-range communication with the vehicle. According to an embodiment, the communication unit 21 may perform NFC communication or UWB communication.

The output unit 22 may output information stored in the user terminal 20 in at least one of a visual manner, an audible manner, or a combination thereof. According to an embodiment, the output unit 22 may be implemented as a display device that adopts a liquid crystal display (LCD) panel, a light emitting diode (LED) panel, an organic light emitting diode (OLED) panel, a plasma display panel (PDP), or the like. The LCD may include a thin film transistor LCD (TFT-LCD). The output unit 22 may be implemented by being formed integrally with the input unit (not shown) by a touch screen panel (TSP).

The storage unit 23 may store at least one algorithm that performs calculation or execution of various commands for operating the user terminal 20 according to one embodiment of the present invention. The storage unit 23 may include one or more storage media, such as flash memory, a hard disk, a memory card, ROM, RAM, EEPROM, PROM, magnetic memory, magnetic disks, or optical disks. The storage unit 23 may store driver information for a plurality of vehicles.

The control unit 24 may be implemented by various processing devices such as a microprocessor having a semiconductor chip capable of performing calculations or executions of various commands embedded therein and may control the operation of the user terminal 20 according to the embodiment. The control unit 24 may be electrically connected to the communication unit 21, the output unit 22, and the storage unit 23 through a wired cable or various circuits to transmit electrical signals including control commands and the like and may transmit and receive electrical signals including control commands and the like by various wireless communication networks such as a CAN.

Figure 4:
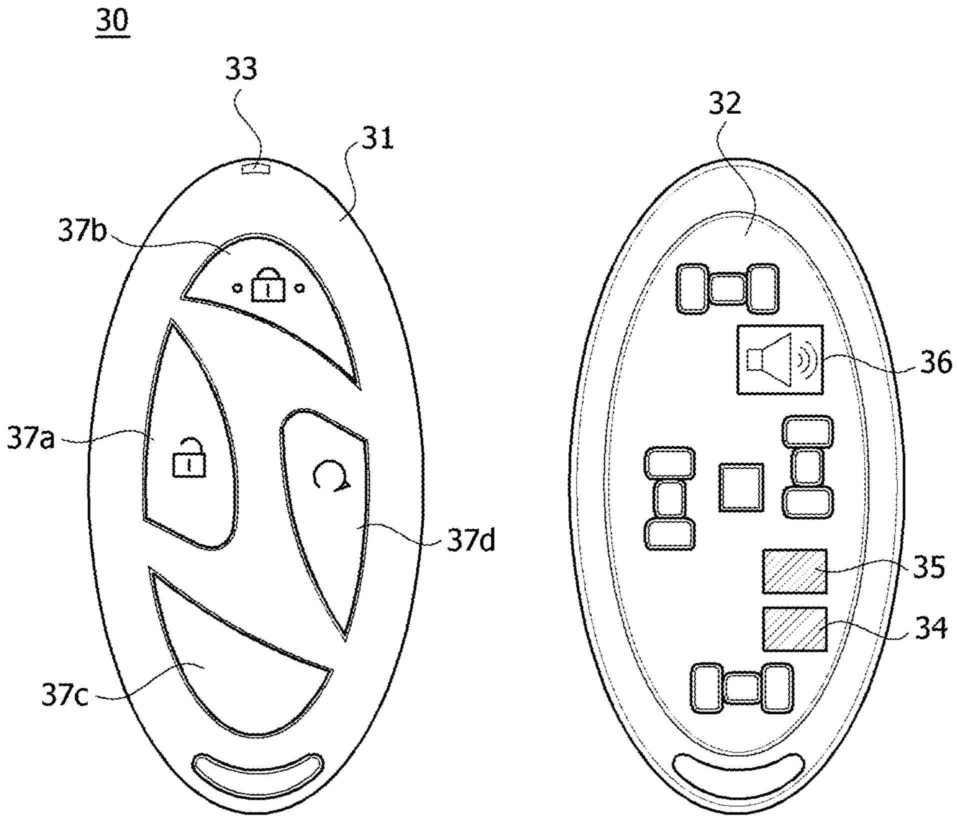
FIG. 4 is a block diagram illustrating a configuration of a fob according to the embodiment.

FIG. 4 is a block diagram illustrating a configuration of a fob according to the embodiment. Referring to FIG. 4, a fob 30 may include a housing 31 made of a plastic material, and a printed circuit board (PCB) 32 may be disposed inside the housing. Various buttons for controlling vehicle doors are positioned on the exterior of the housing 31. For example, a vehicle door open button 37*a*, a vehicle door lock button 37*b*, a trunk open button 37*c*, and a hold button 37*d* may be disposed on the exterior of the housing 31. Each button is electrically connected to the PCB 32 inside the housing.

In addition, a light source 33 for outputting a visual signal may be provided on the exterior of the housing 31. The light source 33 may be electrically connected to the PCB 32 inside the housing 31. A housing area surrounding the light source 33 may be made of a transparent material so that an optical signal output from the light source 33 may be identified from the outside.

The PCB 32 may include a signal processing module 34 for converting a signal input from a button into an electrical signal and a communication module 35 for transmitting the converted electrical signal to the vehicle. The communication module 35 may include at least one of an LF module and the Bluetooth module.

In addition, a speaker 36 for outputting an auditory signal may be built in the housing 31 and electrically connected to the PCB 32.

Figure 5:
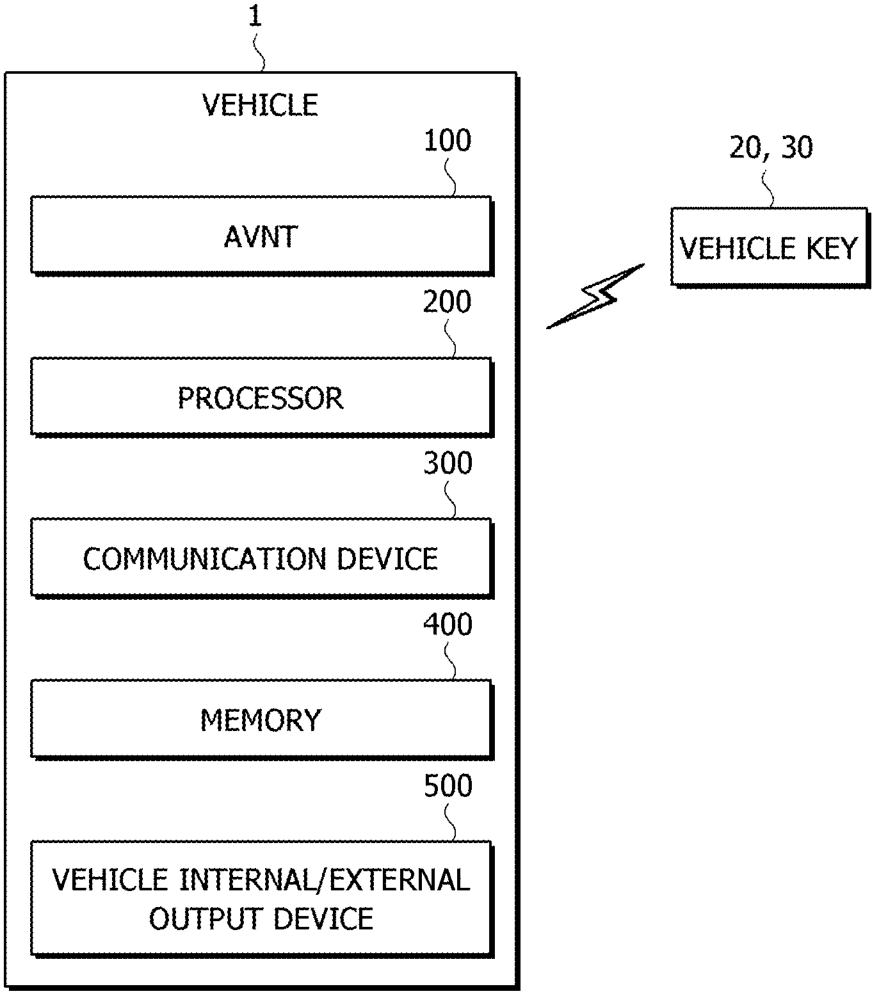
FIG. 5 is a block diagram illustrating a configuration of a vehicle key search system according to the embodiment.

The light source 33 and speaker 36 operate under the control of the signal processing module 34. FIG. 5 is a block diagram illustrating a configuration of a vehicle key search system according to the embodiment. Referring to FIG. 5, a vehicle key search system 10 may include a vehicle 1 including the processor 200, the communication device 300, and a vehicle key. The vehicle key may include at least one of a digital key 20 and a smart key 30.

In an embodiment, the vehicle key may be used as the term including a smart key and a digital key. The fob 30 may operate as the smart key, and the user terminal 20 may operate as the digital key. Hereinafter, the fob 30 may be used as the term referring to the same configuration as the smart key, and the digital key may be used as the term referring to the same configuration as the user terminal 20.

The vehicle key may open and close vehicle doors, start or stop the vehicle, and perform various functions as needed. It may use one or more communication methods, such as low-power Bluetooth (BLE) or NFC. The vehicle key may be operated in conjunction with a specific one vehicle 1, and a plurality of vehicle keys may be linked to one vehicle 1 or one vehicle key may be linked to a plurality of vehicles 1 as needed. In addition, there may also be a case in which a plurality of vehicle keys may be linked to a plurality of vehicles 1.

In addition, the digital key may be operated by being installed in a device such as a smartphone, and there may be a case in which a plurality of digital keys are installed in one smartphone. In the embodiment, the digital key is described as being operated while installed in the smartphone, but is not limited thereto, and may be installed in a device other than the smartphone as needed.

The vehicle key may control the vehicle 1 and to this end, communicate with the vehicle 1 via LF communication, RF communication, BLE communication, UWB communication, wireless Internet network communication, or mobile communication network communication.

The vehicle key may be manipulated so that a user may perform various functions for controlling the vehicle 1 and may be manipulated to set one or more wireless anchors.

The vehicle key may search for nearby wireless anchors and register them. It can use various communication methods to identify wireless anchors capable of establishing a wireless connection. For example, when two wireless anchors are positioned near the vehicle key, one wireless anchor may communicate the vehicle key via BLE communication, and the other may communicate the vehicle key via wireless Internet communication network communication, the vehicle key may be communicatively connected to one of the two wireless anchors or communicatively connected to both wireless anchors.

In an embodiment, the wireless anchor may be the same component as the positioning module.

Figure 6:
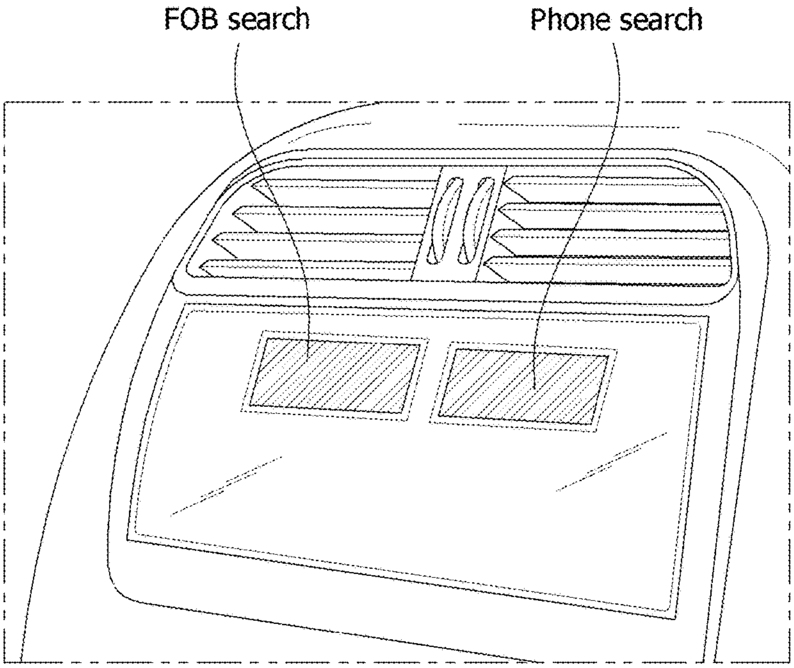
FIGS. 6 to 11 are views illustrating an operation of a processor according to the embodiment.

The processor 200 may output a vehicle key search command in response to a user input. Referring to FIG. 6 together, the vehicle key search command may be input through the AVNT 100. For example, the vehicle key search command may be a smart key 30 search command or a user terminal 20 search command. The vehicle key may be a key of which ID information is registered in the vehicle through an authentication process. In this case, the user terminal 20 may include a digital key, but is not necessarily limited thereto, and may conceptually include all user terminals 20 registered in the vehicle. In an embodiment, for convenience of description, an example in which the user terminal 20 in which a digital key function is implemented will be described.

The communication device 300 outputs a key search signal in response to the vehicle key search command. For example, the communication device 300 may output the key search signal using an LF antenna. The LF antenna may detect the vehicle key by emitting the LF signal. The LF signal may communicate with the vehicle key in a range of about 1 to 2 meters to detect a vehicle key positioned within the above range. The LF antenna may detect the vehicle key using a low frequency band of 125 kHz or 134.2 kHz.

Figure 7:
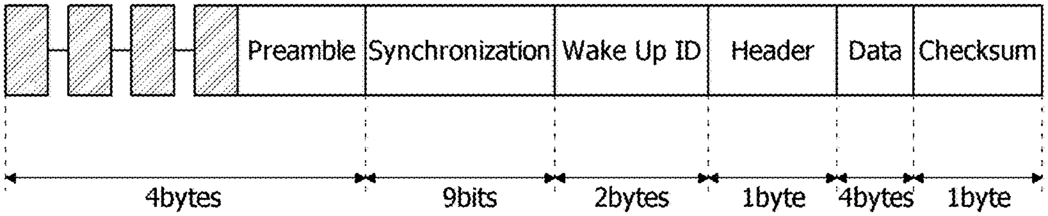
Figure 8:
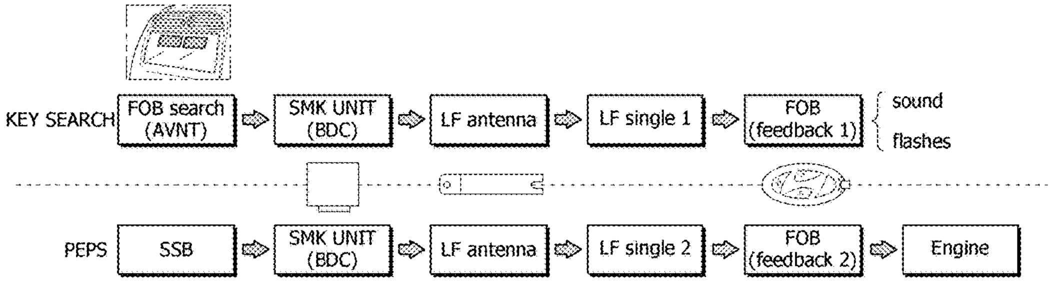

The key search signal may have a different data frame from the signal used when the PEPS function is performed. Referring to FIGS. 7 and 8 together, a data structure of the LF signal output from the LF antenna may include preamble, synchronization, a wake-up ID, a header, data, and check sum information.

The preamble functions to indicate the start of a data frame, and may generally send a signal indicating that data transmission starts to a receiver by repeating a regular pattern (e.g., 1010 or 0101).

The synchronization pattern may be used to synchronize the receiver and a transmitter. The synchronization pattern may help synchronize a data transmission rate and timing.

The wake-up ID may include a unique identification number of the smart key 30, and the vehicle may verify whether the smart key 30 is the correct key through such a code.

The data field is a part including actual data and may include commands, state information, and the like. The command field may include commands to be performed by the smart key 30. For example, the command may include door lock/unlock, engine start, and the like.

The state field provides current state information about the smart key 30 or the vehicle, such as battery status or button press state. In addition, the data field may include the vehicle key search signal. The vehicle key search signal may include a command for controlling the output of the LF signal of the LF antenna for a predetermined time.

The checksum may be used to detect errors that may occur during data transmission. It may help verify the integrity of the transmitted data.

The processor 200 may output a PEPS command or the vehicle key search signal using the data field of the LF antenna signal. That is, when the PEPS operation is performed, command information may be written in the data field, and when an operation of searching for the vehicle key is performed, the vehicle key search signal may be written in the data field.

Figure 9:
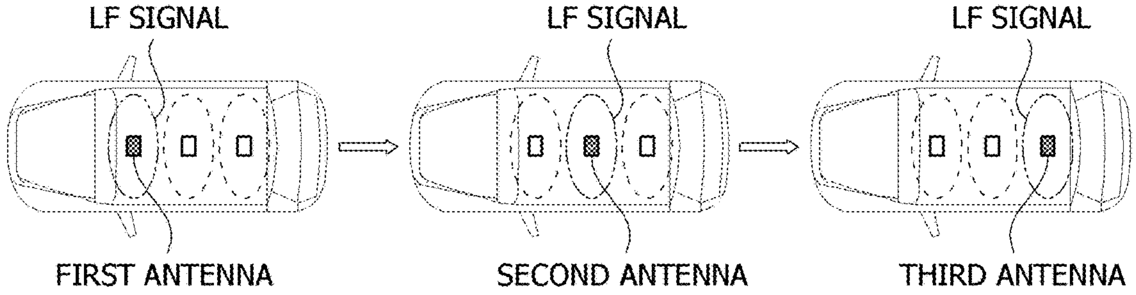

The communication device 300 may sequentially output a key search signal under the control of the processor 200 using a plurality of LF antennas. Referring to FIG. 9 together, the plurality of LF antennas may include a first antenna 350 for detecting a driver seat area of a vehicle, a third antenna 370 for detecting a rear seat and trunk area of the vehicle, and a second antenna 360 for detecting an area between the driver seat and the rear seat. The processor 200 may control the first antenna 350, second antenna 360, and third antenna 370 to output the key search signal sequentially.

The processor 200 may control the first antenna 350, the second antenna 360, and the third antenna 370 to sequentially output the key search signal according to a preset search period. In addition, the processor 200 may control the communication device 300 to stop outputting the key search signal when receiving a response signal. For example, the processor 200 may control the first antenna 350, the second antenna 360, and the third antenna 370 to sequentially output the key search signal at 1-second intervals and control the next-order antenna not to output the key search signal when receiving a response signal from the vehicle key.

The vehicle key may transmit a response signal, which is an RF signal, to the communication device 300 in response to the LF signal of the LF antenna.

The processor 200 may display an area in which the vehicle search signal corresponding to the response signal is output through a vehicle internal/external output device 500. When the communication device 300 receives the response signal, the processor 200 may specify an antenna that outputs the key search signal immediately before the time point when the response signal is received. The processor 200 may display an LF signal output area of a specific antenna through the vehicle internal/external output device 500 and at the same time, output a visual or auditory signal to indicate that the above area is an area in which key search is completed.

In an embodiment, the vehicle internal/external output device 500 may include visual and/or auditory output devices mounted inside and/or outside the vehicle. In an embodiment, the vehicle internal/external output device 500 may include a speaker, a display, a lamp, and the like and may be used as a concept including the AVNT 100.

Alternatively, the communication device 300 may output the key search signal using a Bluetooth communication module. When the Bluetooth communication module is mounted on the vehicle key to enable Bluetooth communication or when LF communication is impossible, the communication device 300 may search for the smart key 30 or the user terminal 20 using the Bluetooth communication module.

Figure 10:
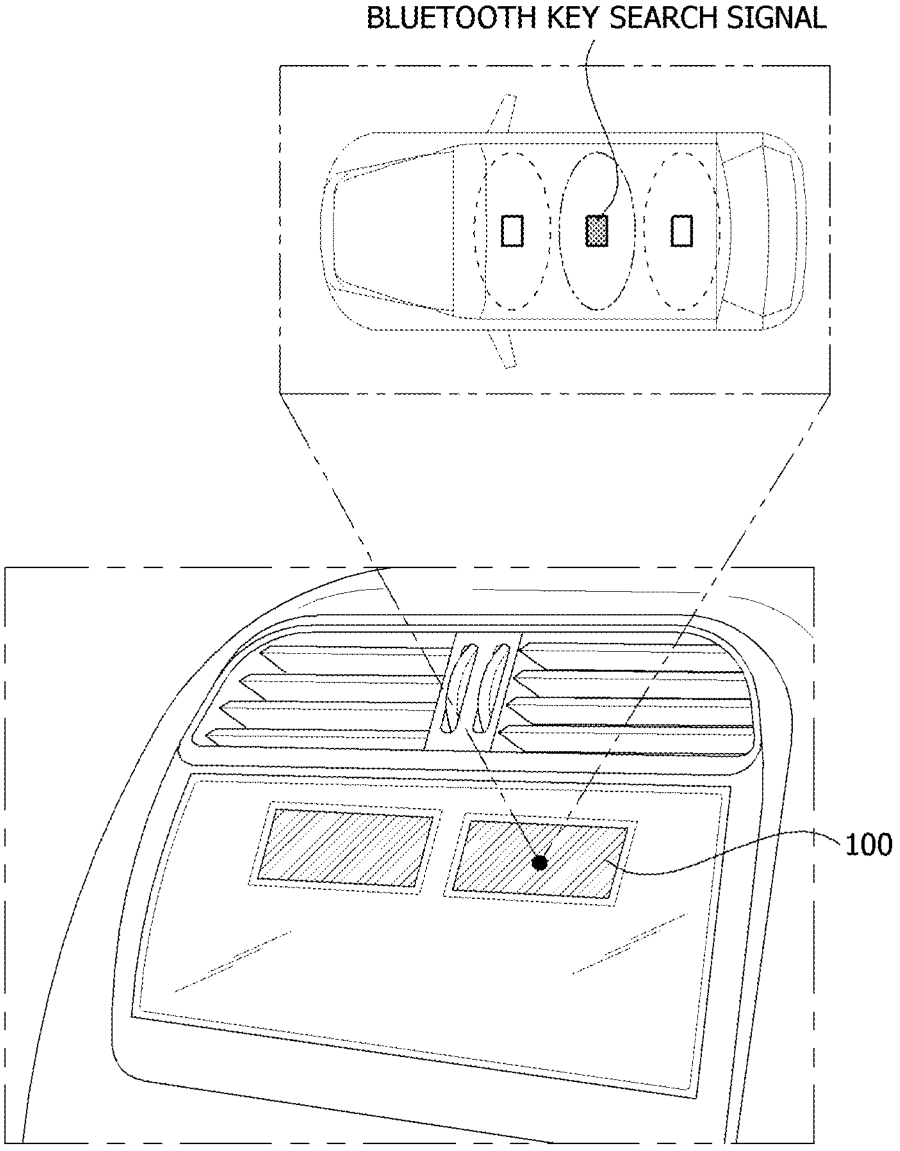
Figure 11:
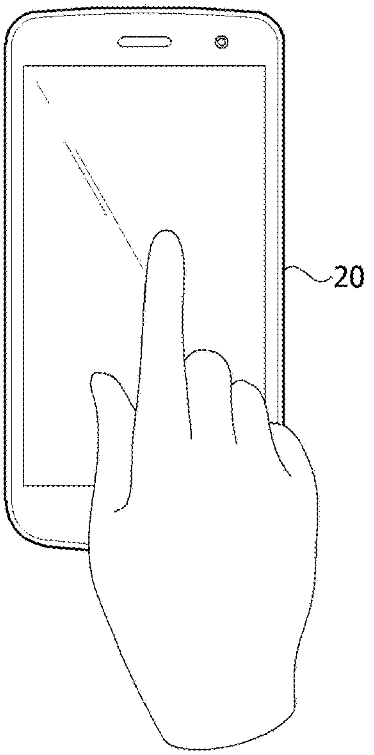

Referring to FIGS. 10 and 11, the processor 200 may execute a Bluetooth application to establish communication with the communication device 300, enabling a pairing operation. The Bluetooth communication module of the vehicle may periodically broadcast the key search signal under the control of the processor 200. In this case, the key search signal may include a unique identifier and service information of the vehicle.

The user terminal 20 may be set to a Bluetooth signal scanning mode to detect the key search signal of the vehicle. When the user terminal 20 receives the key search signal of the vehicle, the application of the user terminal 20 may analyze the key search signal. The user terminal 20 may return a response signal including a unique identifier and authentication information of the user terminal 20 to the vehicle.

The processor 200 may measure the vehicle key's position using the response signal and determine the relative position of the user terminal 20 relative to the vehicle. In an embodiment, the relative position may include a distance between the vehicle and the user terminal 20 and a direction in which the user terminal 20 is positioned with respect to the vehicle, and the relative position between the vehicle and the user terminal 20 may be determined through the RSSI method that estimates a distance by measuring the strength of a Bluetooth signal as described above.

The processor 200 may display the measured position of the vehicle key via the vehicle internal/external output device 500. In this case, the position of the vehicle key may be displayed so that an area including an error range according to the result of positioning is visually distinguished from other areas.

When the processor 200 does not receive the response signal within a preset time after outputting the key search signal, the processor 200 may output a message through the vehicle internal/external output device 500. In this case, the message may include letters, symbols, numbers, and the like representing a failure of the vehicle key search.

For example, the processor 200 may transmit the key search signal via the Bluetooth module and output a key search failure message if no response signal is received within 3 seconds. For example, the processor 200 may output the key search signal through the Bluetooth module and output the key search failure message when 3 seconds elapse without receiving the response signal.

When receiving the vehicle key search signal, the vehicle key may transmit a response signal corresponding to the vehicle key search signal to the communication device 300 and externally output at least one of a visual signal and an auditory signal.

When receiving the key search signal using the LF antenna, the vehicle key may transmit the RF signal as the response signal to the communication device 300.

Alternatively, when receiving the key search signal using the Bluetooth module, the vehicle key may transmit the Bluetooth signal as the response signal to the communication device 300.

If the vehicle key is a digital key, it may emit visual and auditory signals through a light source and a speaker upon receiving the key search signal. When the vehicle key is the user terminal 20, the user terminal 20 receiving the key search signal may externally output the visual and auditory signals through the output unit. In addition, the user terminal 20 may output a vibration signal together.

Figure 12:
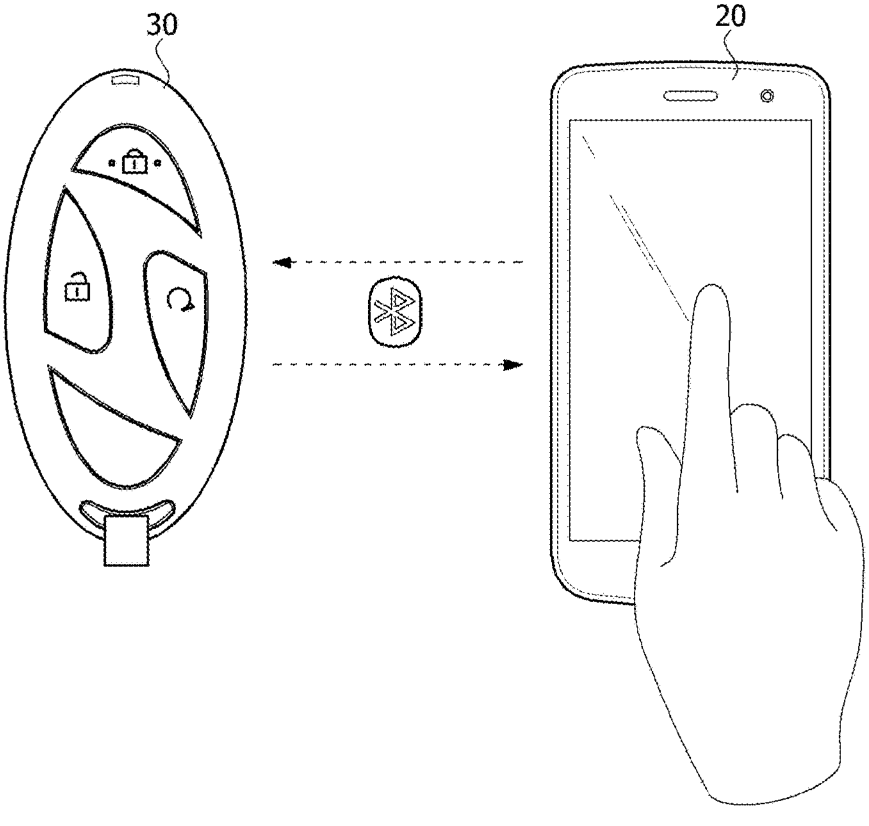
FIG. 12 is a view for describing a vehicle key search system according to another embodiment.

FIG. 12 is a view for describing a vehicle key search system according to another embodiment. Referring to FIG. 12, the vehicle key search system according to the embodiment may include a first vehicle key 20 and a second vehicle key 30.

In an embodiment, the first vehicle key 20 may be a smart key or a digital key, while the second vehicle key 30 is a different type. For instance, if the first vehicle key 20 is a smart key, the second vehicle key 30 may be a digital key, and vice versa. The first vehicle key 20 may output a vehicle key search signal in response to a user input. When the first vehicle key 20 is the digital key, a vehicle key search command may be input through an application installed on a user terminal. When the first vehicle key 20 is the smart key, the vehicle key search command may be input using an input button (e.g., continuous door lock button input) provided on the exterior of the housing. When receiving the user's vehicle key search command, the first vehicle key 20 may convert the above command into an electrical signal and output the electrical signal through the communication module.

Upon receiving the vehicle key search signal, the second vehicle key 30 transmits a corresponding response signal back to the first vehicle key 20 and emits at least one of a visual or auditory signal. In an embodiment, the key search signal and the response signal may be Bluetooth signals.

When the second vehicle key 600 is the digital key, the digital key receiving the key search signal may externally output the visual signal and the auditory signal through the light source and the speaker.

If the second vehicle key 600 is a user terminal, it may emit visual and auditory signals via the output unit upon receiving the key search signal. Additionally, it may also generate a vibration signal. For convenience, one or more figures are described by way of an example in which the steps are performed by a processor circuit. One, some, or all steps of the example method of a figure, or portions thereof, may be performed by one or more other circuits. One or some, steps of the example method of a figure may be omitted, performed in other orders, and/or otherwise modified, and/or one or more additional steps may be added.

Figure 13:
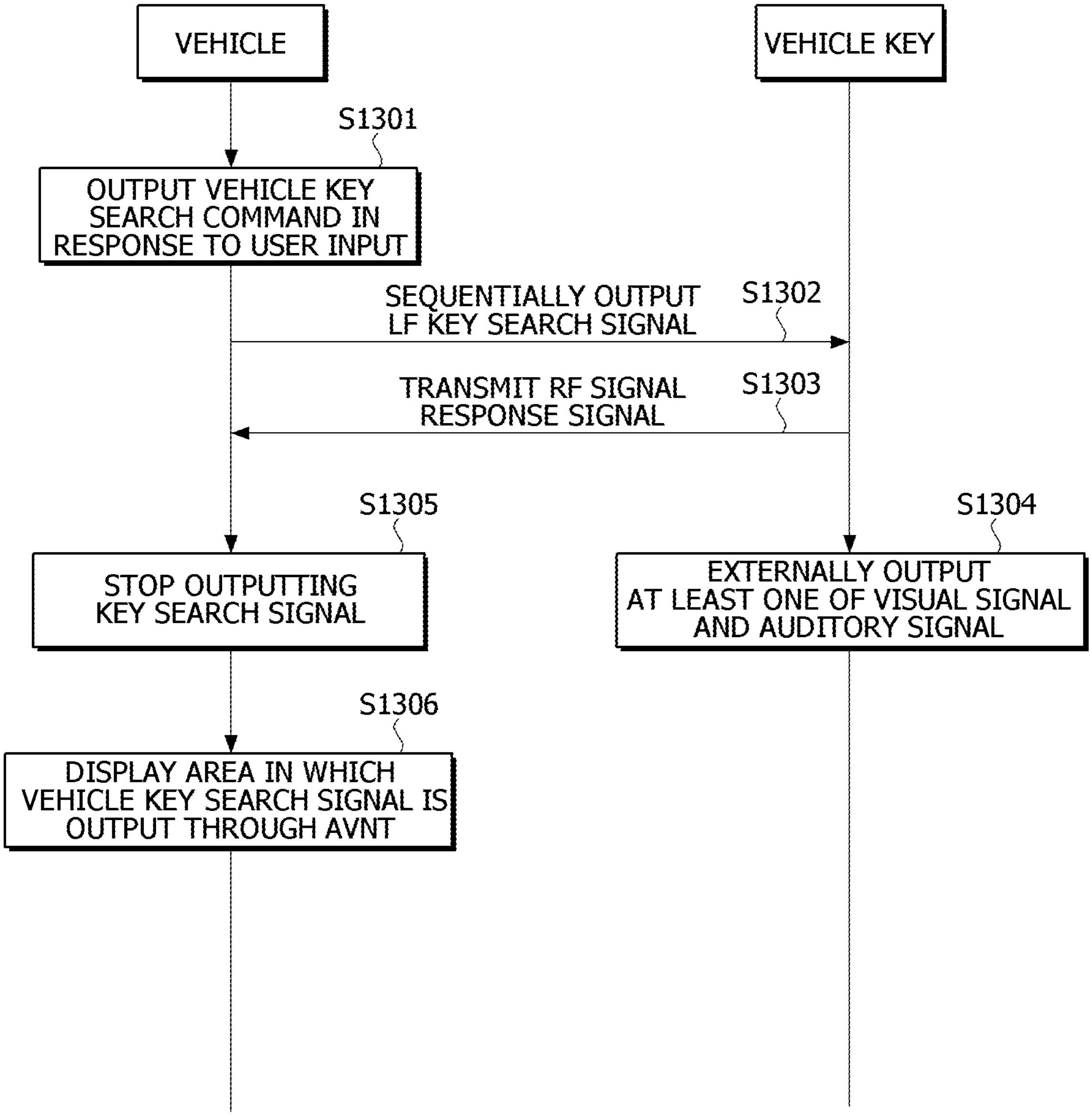
FIGS. 13 to 15 are flowcharts illustrating a vehicle key search method according to an embodiment.

FIG. 13 illustrates a flowchart of a vehicle key search method according to an embodiment.

Referring to FIG. 13, a processor may output a vehicle key search command in response to a user input. The vehicle key search command may be entered via an AVNT. For example, the vehicle key search command may be a smart key search command or a user terminal search command (S1301).

Next, a communication device may output a key search signal in response to the vehicle key search command. The communication device may sequentially output the key search signal using a plurality of LF antennas under the control of the processor (S1302).

Next, a vehicle key may transmit a response signal, which is an RF signal, to the communication device in response to an LF signal of the LF antenna (S13030).

Next, the vehicle key may externally output at least one of a visual signal and an auditory signal (S1304).

Next, the processor may control the communication device to stop outputting the key search signal when receiving the response signal (S1305).

Next, the processor may display an area in which the vehicle key search signal corresponding to the response signal is output on the AVNT (S1306).

Figure 14:
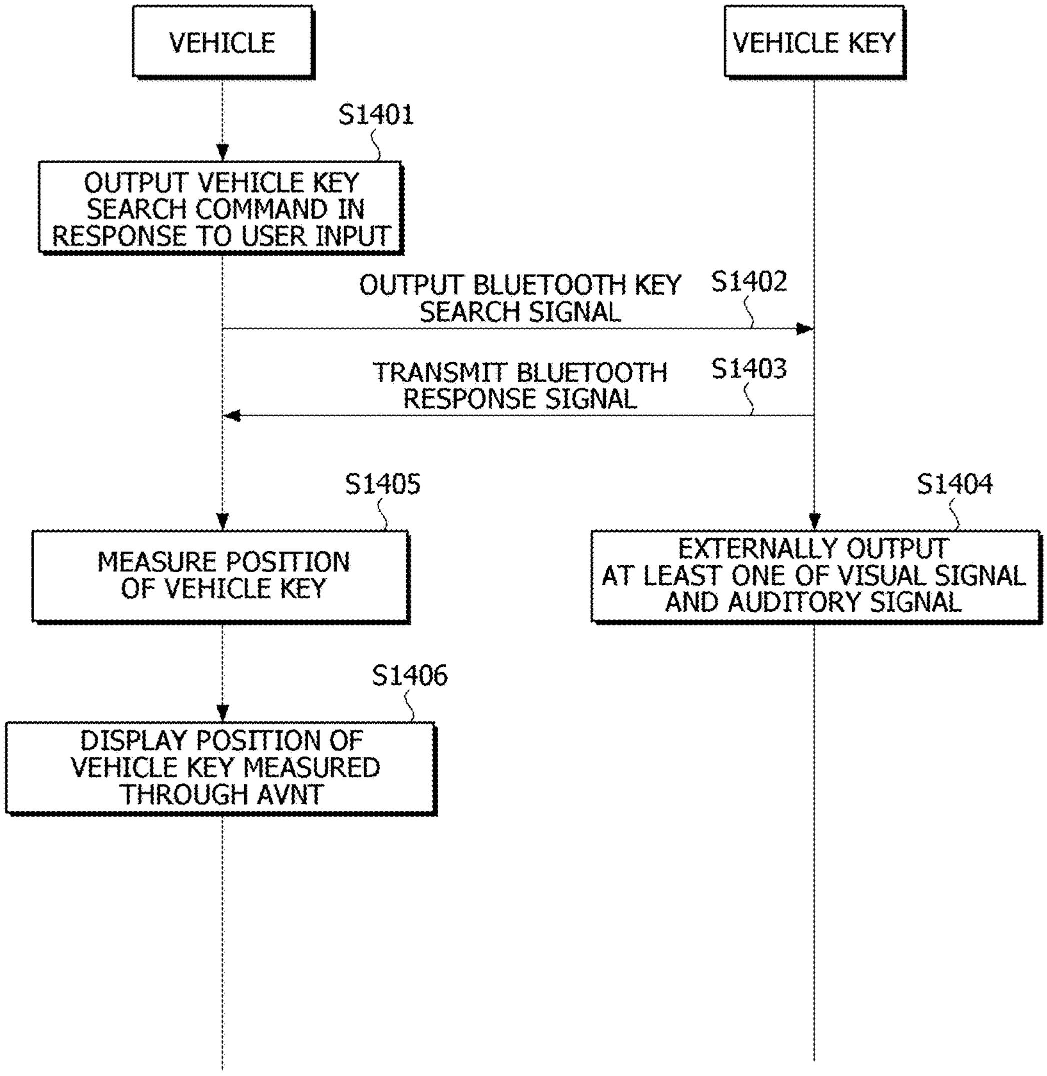

FIG. 14 illustrates a flowchart of a vehicle key search method according to another embodiment.

Referring to FIG. 14, a processor may output a vehicle key search command in response to a user input. The vehicle key search command may be input via an AVNT. For example, the vehicle key search command may be a smart key search command or a user terminal search command (S1401).

Next, a communication device may output a key search signal in response to the vehicle key search command. The communication device may sequentially output the key search signal under the control of the processor using a Bluetooth communication module (S1402).

Next, a vehicle key may transmit a Bluetooth response signal to the communication device in response to the key search signal (S1403).

Next, the vehicle key emits at least one of a visual or auditory signal externally (S1404). Next, the processor may measure a position of the vehicle key using the response signal (S1405).

Next, the processor may display the position of the vehicle key measured through the AVNT (S1406).

Figure 15:
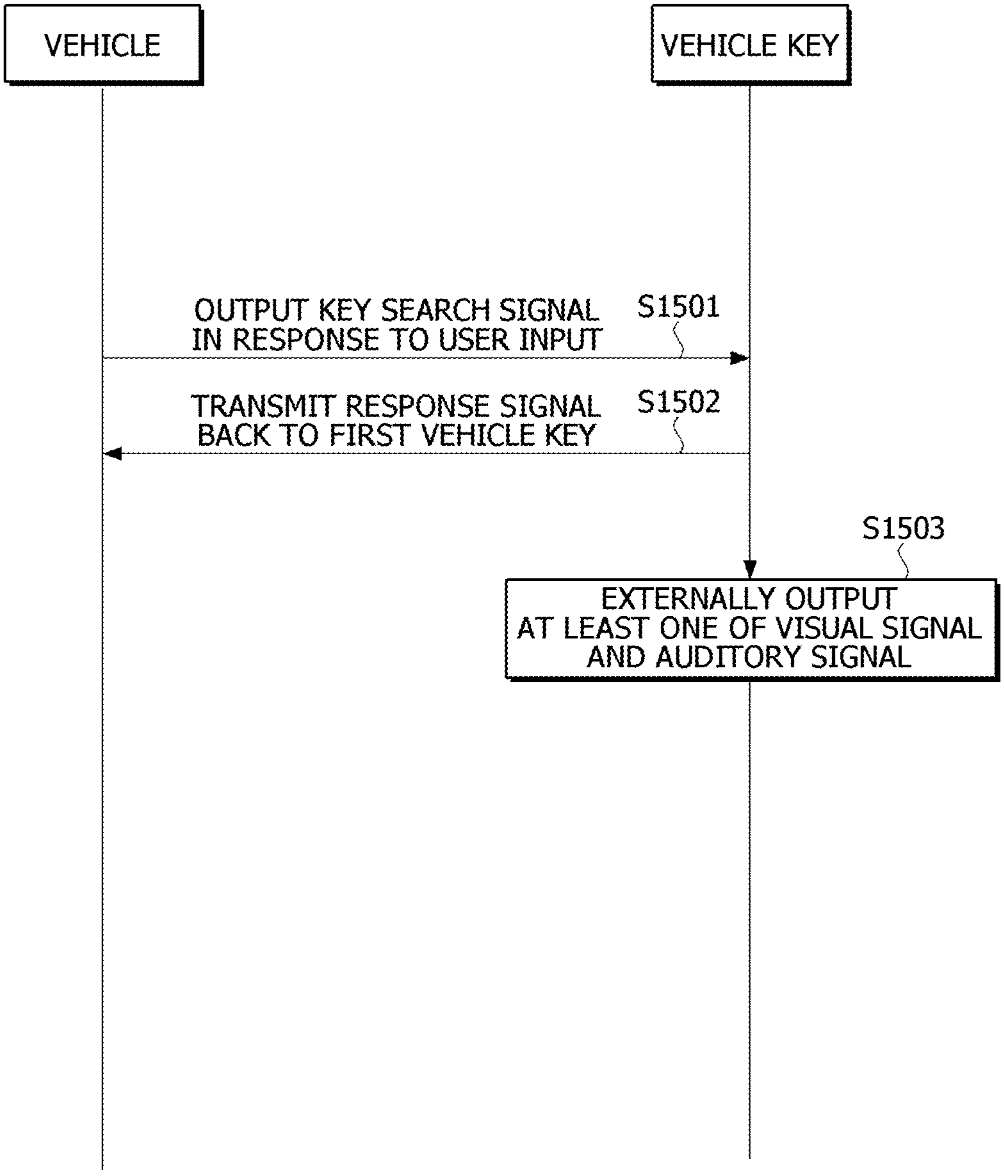

FIG. 15 illustrates a flowchart of a vehicle key search method according to still another embodiment.

Referring to FIG. 15, a first vehicle key may output a vehicle key search command in response to a user input. At this time, when the first vehicle key is a digital key, a vehicle key search command may be input through an application installed on a user terminal. Alternatively, when the first vehicle key is a smart key, the vehicle key search command may be input using an input button provided in the exterior of a housing. When receiving the user's vehicle key search command, the first vehicle key may convert the above command into an electrical signal and output the electrical signal through a communication module (S1501).

In an embodiment, the key search signal is a Bluetooth signal.

Next, a second vehicle key may transmit a response signal corresponding to the vehicle key search signal back to the first vehicle key (S1502).

In an embodiment, the response signal is a Bluetooth signal.

Next, the second vehicle key may externally output at least one of a visual signal and an auditory signal. At this time, when the second vehicle key is a digital key, the digital key receiving the key search signal may externally output the visual signal and the auditory signal through a light source and a speaker. Alternatively, when the second vehicle key is a user terminal, the user terminal receiving the key search signal may externally output the visual signal and the auditory signal through the output unit. In addition, the user terminal may output a vibration signal together (S1503).

The term "~unit" used in the present embodiment means a software or hardware component such as a field-programmable gate array (FPGA) or an ASIC, and the "~unit" performs certain roles. However, the "unit" is not limited to software or hardware. The "unit" may be configured to be disposed in an addressable storage medium and configured to reproduce one or more processors. Therefore, as an example, the "unit" is components such as software components, object-oriented software components, class components, and task components, processes, functions, attributes, procedures, subroutines, segments of program code, drivers, firmware, microcode, circuits, data, database, data structures, tables, arrays, and variables. Functions provided in the components and "~units" may be combined into the smaller number of components and "unit" or separated into additional components and "units." Additionally, the components and "~units" may be implemented to reproduce one or more CPUs in a device or a security multimedia card.

A vehicle key search system and method, as described in these embodiments, can locate a smart key or digital key using a vehicle and determine its position. In addition, it is possible to search for the smart key using a user terminal and find its position.

Similarly, the smart key can be used to locate the user terminal or digital key and determine their position. While the present invention has been described with reference to exemplary embodiments, those skilled in the art will recognize that various modifications and changes can be made without departing from its spirit and scope as defined in the appended claims.

What is claimed is:

1. A vehicle key search system comprising:

a vehicle including a processor configured to output a vehicle key search command in response to a user input, and a communication device configured to output a vehicle key search signal in response to the vehicle key search command; and a vehicle key that transmits a response signal corresponding to the vehicle key search signal back to the communication device when receiving the vehicle key search signal and configured to externally output at least one of a visual signal and an auditory signal, wherein the communication device includes a plurality of Low-Frequency (LF) antennas disposed in different areas of the vehicle, wherein the processor is configured to control the plurality of LF antennas to sequentially output the vehicle key search signal according to a preset search period, and wherein the processor specifies a specific LF antenna that output the vehicle key search signal immediately before a time point when the response signal is received, and determines an area corresponding to the specific LF antenna as a position of the vehicle key.

2. The vehicle key search system of claim 1, wherein the communication device stops outputting the vehicle key search signal when receiving the response signal.

3. The vehicle key search system of claim 1, wherein the processor displays an area in which the vehicle key search signal corresponding to the response signal is output through a vehicle internal/external output device.

4. The vehicle key search system of claim 1, wherein the key search signal includes a different data frame from a signal used when a passive-entry-passive-start (PEPS) function is performed.

5. The vehicle key search system of claim 1, wherein the communication device is configured to output the key search signal via a Bluetooth communication module.

6. The vehicle key search system of claim 5, wherein the processor measures a position of the vehicle key based on the response signal.

7. The vehicle key search system of claim 6, wherein the processor displays the position of the vehicle key measured via a vehicle internal/external output device.

8. The vehicle key search system of claim 1, wherein the processor is configured to output a message via a vehicle internal/external output device if the response signal is not received within a preset time after outputting the key search signal.

9. A vehicle key search method comprising:

outputting, by a processor of a vehicle, a vehicle key search command in response to a user input;

sequentially outputting, by a plurality of Low-Frequency (LF) antennas disposed in different areas of the vehicle, a vehicle key search signal according to a preset search period in response to the vehicle key search command;

receiving, by a vehicle key, the vehicle key search signal;

transmitting, by the vehicle key, a response signal corresponding to the vehicle key search signal; and externally outputting, by the vehicle key, at least one of a visual signal and an auditory signal, specifying, by the processor, a specific LF antenna that output the vehicle key search signal immediately before a time point when the response signal is received; and determining, by the processor, an area corresponding to the specific LF antenna as a position of the vehicle key.

10. The vehicle key search method of claim 9, further comprising stopping outputting the key search signal when receiving the response signal using the processor.

11. The vehicle key search method of claim 9, further comprising using the processor to display an area in which the vehicle key search signal corresponding to the response signal is output via a vehicle internal/external output device when receiving the response signal.

12. The vehicle key search method of claim 9, wherein the outputting of the key search signal includes using the processor to output the key search signal via a Bluetooth communication module.

13. The vehicle key search method of claim 12, further comprising measuring a position of the vehicle key based on the response signal when receiving the response signal using the processor.

14. The vehicle key search method of claim 13, further comprising displaying the position of the vehicle key measured via a vehicle internal/external output device using the processor.

15. The vehicle key search method of claim 9, further comprising outputting, by the processor of the vehicle, a message via a vehicle internal/external output device if the response signal is not received within a preset time after outputting the key search signal.

* * * * *